Aug. 13, 1957
F. R. WILHELM
2,802,262
TUBE CUTTER
Filed July 12, 1956
2 Sheets-Sheet 1
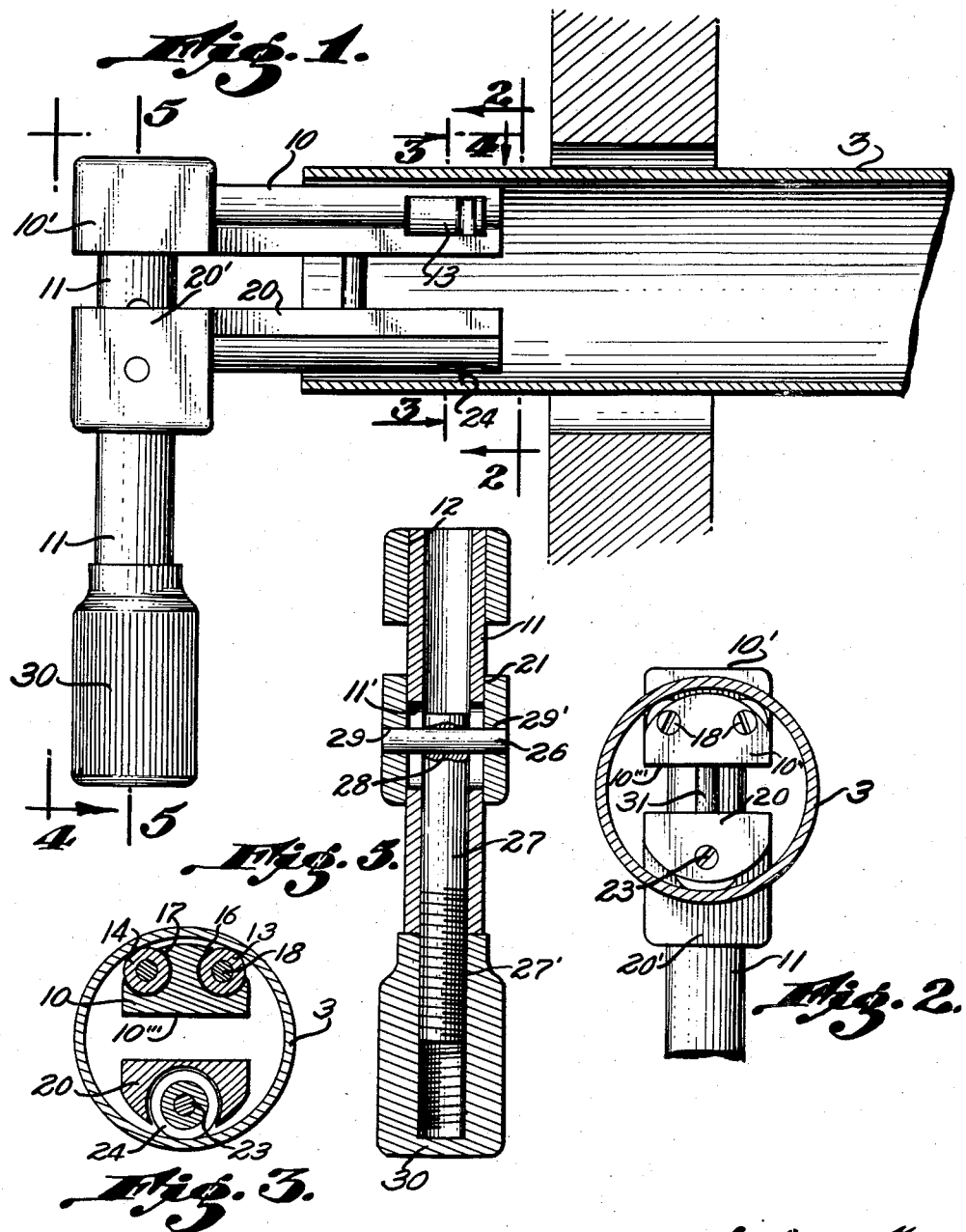

Aug. 13, 1957  F. R. WILHELM  2,802,262
TUBE CUTTER
Filed July 12, 1956  2 Sheets-Sheet 2
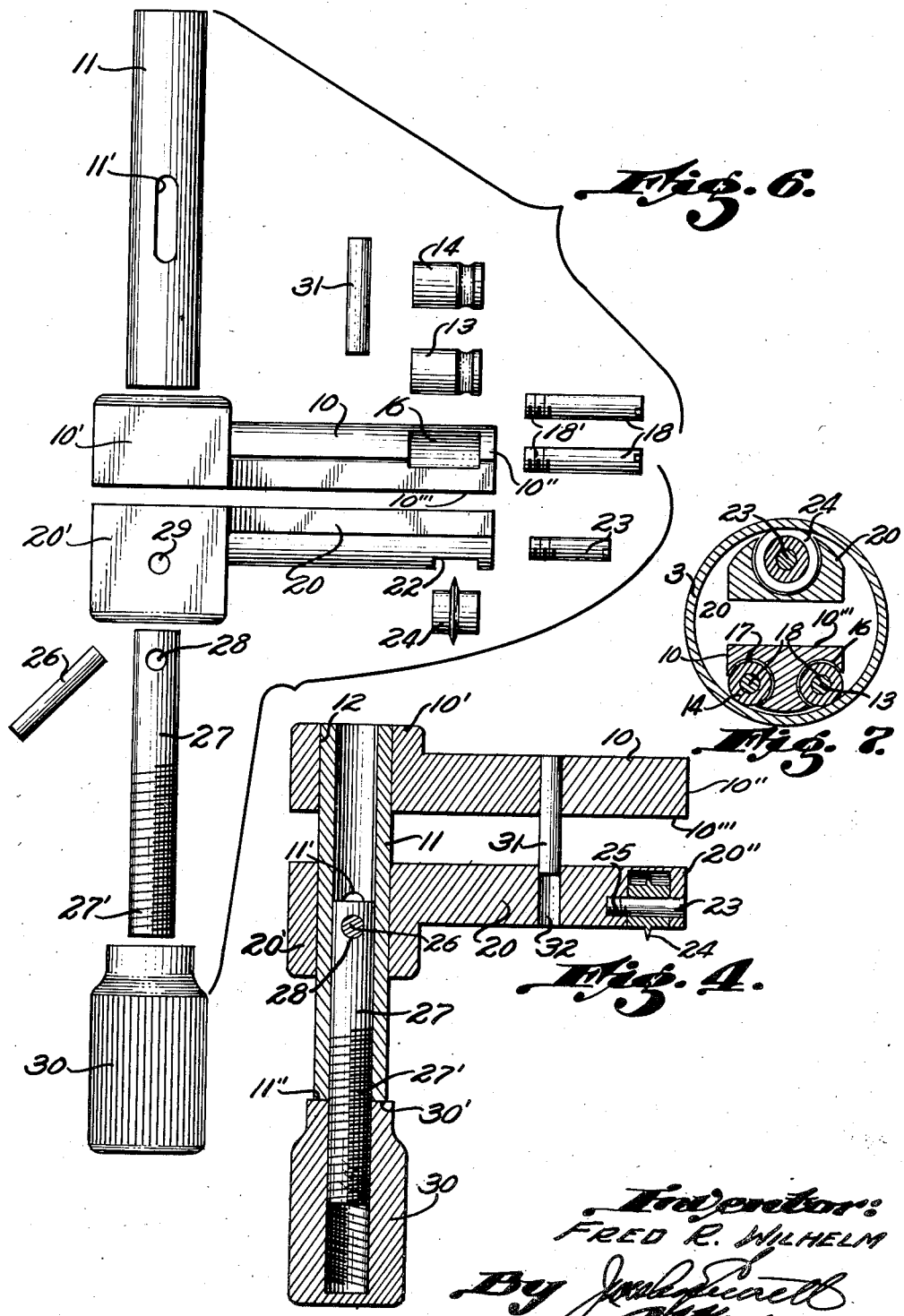

2,802,262
Patented Aug. 13, 1957

2,802,262
TUBE CUTTER
Fred R. Wilhelm, Baltimore, Md.

Application July 12, 1956, Serial No. 597,499

2 Claims. (Cl. 30—105)

The present invention relates to an improved tube or pipe cutting device and in particular for a tube cutting device adapted to cut the tube or pipe wall from the inside surface outwardly toward the outside surface.

There are several types of this cutting device known in the art but, because of their complicated structure and delicate moving parts they have not been very practical and therefore not generally adopted.

The primary object of the invention is to provide such a tube cutter that is economical to manufacture and practical in its operation.

Another object of the invention is to construct such a tube cutter which will be rigid in its construction and have a minimum number of moving parts.

A further object of the invention is to provide such a tube cutter which may be adjusted to considerable range for cutting tubing of various sizes without sacrificing its rigidity.

While several of the objects have been pointed out, other objects may be apparent along with its uses and advantages as the nature of the invention is more fully disclosed, including its novel construction, the arrangement and combination of its several parts which is illustrated in the accompanying drawing and described in the detailed description.

In the drawings:

Figure 1 is a view in elevation of the improved tube cutter showing it in cutting position within a tube.

Figure 2 is a sectional view taken along line 2—2 of Figure 1.

Figure 3 is a sectional view taken along the line 3—3 of Figure 1.

Figure 4 is a vertical sectional view of the device.

Figure 5 is a sectional view taken along line 5—5 of Figure 1.

Figure 6 is an exploded view showing the several parts independently of each other and in position to be assembled.

Figure 7 is a view similar to Figure 3 in which the cutter element and the roll supporting elements are in reversed order.

In referring to the drawings, like numerals are used to designate like and similar parts throughout the several views.

The cutter is shown in Figure 1 assembled and in cutting position within a tube 3. The cutter comprises a stationary jaw 10 having an enlarged end portion 10' for receiving a hollow pin 11. This pin 11 is force-fitted into an opening 12 in the portion 10' of the jaw for supporting the same.

Carried adjacent the opposite end of the jaw 10 are two rolls 13 and 14. The jaw is recessed at 16 and 17 for receiving these rolls. The rolls are supported within the recesses and upon the jaw by pins 18 which are provided with threaded end portions 18'.

It will be noted that the recesses 16 and 17 are spaced inwardly from the inner end of the jaw member leaving a portion 10" for supporting the outer end of the screws 18. The portion 10" is provided with openings of such size as to slidably receive the screw, and the rollers 14 and 15 are also provided with center openings adapted to rotate about the screws 18. On the inner end of the screw 18 there is provided a threaded portion 18", and opposite the hold 10" in the portion 10' is a threaded aperture (not shown) to receive the threaded end 18" of the screw 18. Therefore, the supporting rolls 14 and 15 are secured to the inner end of the head in the position as shown in Figure 3 by the means just described.

The portion 10 of the stationary jaw is preferably of semi-circular form, that is, the outer surface of the jaw adapted to operate adjacent the tubing is generally formed to coincide with the general form of the tube while the opposite side 10'" is flat.

Associated with the stationary jaw 10 is a movable jaw 20. This movable jaw is provided with an outer portion 20' similar to the outer portion 10' of the stationary jaw. The portion 20 of the movable jaw is of substantially the length and form as the stationary jaw as shown in Figures 1 and 3. Extending through the portion 20' of the movable jaw is an aperture 21 which is of such size as to slidably receive the tube 11 which is fixed in the portion 10' of the stationary head.

On the inner end of the movable member there is a recess 22 which is substantially opposite the recesses 14 and 15 in the jaw member 10. It will be noted that this recess also extends inwardly a short distance from the inner end of the movable member 20 as shown at 20.". This portion 20" is provided with an aperture for receiving a screw 23 similar to the screws 18 to support a rotary tube cutting element.

The rotary cutting element is rotatably supported within the recess 22, as indicated at 24. This tube cutting element is provided with a center aperture of sufficient size as to rotatably receive the pin 24. The cutter is mounted in the movable jaw by placing the cutter within the recess 22 and extending the pin through the opening in the portion 20" of the jaw and through the center opening of the cutter and into a threaded aperture beyond the cutting element as shown at 25 in Figure 4.

Referring again to the tube 11 which is fixedly secured to the stationary member 10 the tube is slotted as shown at 11'. Adapted to slide within this slot 11' is a pin 26. In assembling this portion of the cutter after the tube 11 has been fixed in the stationary head portion 10', the tube member 11 is extended through the opening 21 in the movable head where it extends for some distance beyond the opposite side of the portion 20' of the slidable jaw.

In order to operate or move the jaws relative to each other, there is provided a shaft 27 having adjacent its outer end threads 27'. The opposite end of the shaft is provided with an aperture 28 to receive the pin 27. There is also an aperture 29 and 29' within the jaw portion 20 which is adapted to frictionally receive the pin 27. In order to move the shaft 27 relative to the tube 11 there is provided a handle member 30. This handle member is provided with a threaded aperture for receiving threads 27' on the lower end of the shaft 27 and when the handle is rotated to the right its inner surface 30' engages the outer end of the tube 11 at 11" and moves the shaft through the tube 11 toward the handle member 30. When the handle member is rotated to the left and moved outwardly along the threads 27' the two jaws may be manually pressed together.

In order to maintain the movement of the two jaws parallel with a plane passing through the long axes, there is a pin 31 carried preferably by the stationary member 10. This pin is adapted to be received within an opening 32 of such size as to slidably receive the pin as the jaws are moved relative to each other.

The two jaws are assembled after the tube member 11 has been extended through the opening 21 of the movable jaw by placing the pin 27 through the openings 29 and 29' in the movable jaw portion 20 and the slot 11' of the pin 11 and through the opening 28 in shaft member 27. In this way the movement of the shaft 27 moves the movable jaw relatively to the stationary jaw throughout the limits of the slot 11' in the tube 11.

While the cutting element 24 is shown in the movable jaw it may be carried in the stationary jaw, that is, the supporting rolls in the jaw member 10 may be carried in the jaw member 20 and the cutter 24 may be carried in the jaw member 10, as shown in Figure 7.

Again it may be more desirable or efficient for certain types of work to replace the rollers 14 and 15 with cutter elements in place of using the rollers and depend upon the guiding of the cutting tool within the tube by the general form of the jaws or some other conventional means.

While the preferred form of the invention has been shown and described in detail, it is not intended as a limitation as it is obvious that various changes and modifications of the device may be made without depending upon the principles illustrated herein. Therefore, the scope of the invention is best defined in the appended claims.

What is claimed is:

1. An inside tube cutter comprising, in combination, an elongated stationary jaw having an enlarged outer end portion and an adjacent elongated movable jaw of substantially the same length having a corresponding enlarged outer end portion of substantially the same size as the stationary jaw, the movable jaw having its long central axis parallel with the long central axis of the stationary jaw, the jaw members having substantially flat adjacent sides and arcuated outer sides, means adjacent one end of the jaws for moving the jaws parallel and relative to each other comprising, a tubular member fixedly secured at right angles to the enlarged portion of the stationary jaw member and adapted to pass through an opening at right angles in the enlarged portion of the movable jaw member, a pin adapted to be slidably receivable within the tube and to extend beyond the end thereof, the outer end of the pin being threaded and its inner end being hingedly connected to the enlarged portion of the movable jaw member by a second smaller pin running perpendicular through the inner end of the first mentioned pin, the tube having a slot therein to accommodate the second mentioned pin throughout the movable range of the movable jaw, a handle having a threaded aperture threadably received over the threaded end of the first mentioned pin and adapted to bear against the outer end of the tube for forcing the jaws apart, a rotatable cutting element carried on the arcuated surface of at least one of the said jaws adjacent its end opposite its enlarged end for engaging the inside surface of the tube for cutting the same from the inside outwardly toward the outer surface thereof and means for maintaining the jaws in alignment.

2. An inside tube cutter comprising, in combination, an elongated stationary jaw having an enlarged outer end portion and an adjacent elongated movable jaw of substantially the same length having a corresponding enlarged outer end portion of substantially the same size as the stationary jaw, the movable jaw having its long central axis parallel with the long axis of the stationary jaw member, the jaw members having substantially flat adjacent sides and arcuated outer sides, means adjacent one end of the jaws for moving the jaws relative to each other comprising, a tubular member fixedly secured at right angles to the enlarged portion of the stationary jaw member and adapted to pass through an opening at right angles in the enlarged portion of the movable jaw member, a pin adapted to be slidably receivable within the tube and to extend beyond the end thereof the outer end of the pin being threaded and its inner end being hingedly connected to the enlarged portion of the movable jaw member by a second smaller pin extending perpendicular through the inner end of the first mentioned pin, the tube having a slot therein to accommodate the second mentioned pin throughout the movable range of the movable jaw, a handle having a threaded aperture threadably receivable over the threaded end of the first menitoned pin adapted to bear against the outer end of the tube for forcing the jaws apart, a rotary cutting element carried centrally and on the arcuated surface adjacent the end opposite the enlarged end of one of the said jaws, the cutting edge of the cutting element extending outwardly beyond the outer arcuated surface of the jaw and a pair of supporting rolls carried adjacent the corresponding end of the other jaw and on the arcuated surface thereof opposite the cutting element and extending outwardly beyond outer surface of the jaw, the rolls being on each side of a plane passing through the center of the jaws in the direction of their movement and means for maintaining the jaws in alignment.

References Cited in the file of this patent
UNITED STATES PATENTS

| | | |
|---|---|---|
| 713,108 | Kauffman | Nov. 11, 1902 |
| 1,240,779 | Powers | Sept. 18, 1917 |
| 2,526,471 | Ginns | Oct. 17, 1950 |
| 2,666,984 | Shafer | Jan. 26, 1954 |